United States Patent [19]
Park et al.

[11] Patent Number: 6,039,558
[45] Date of Patent: Mar. 21, 2000

[54] MOLD FOR INJECTION MOLDING OF A PLASTIC PRODUCT

[75] Inventors: Jong-kwon Park; Anjai Tsuneji, both of Kwangju, Rep. of Korea

[73] Assignee: Samsung Electronics Co., Ltd., Suwon, Rep. of Korea

[21] Appl. No.: 09/078,518

[22] Filed: May 14, 1998

[30] Foreign Application Priority Data

Sep. 29, 1997 [KR] Rep. of Korea ........................ 97-49629
Nov. 29, 1997 [KR] Rep. of Korea ........................ 97-64501

[51] Int. Cl.$^7$ .................................................. B29C 45/44
[52] U.S. Cl. .................. 425/556; 425/577; 425/DIG. 58
[58] Field of Search ............................ 425/DIG. 58, 556, 425/577

[56] References Cited

U.S. PATENT DOCUMENTS 3,595,301  7/1971  Bauer ............................... 425/DIG. 58

*Primary Examiner*—Tim Heitbrink
*Attorney, Agent, or Firm*—Burns, Doane, Swecker & Mathis, L.L.P.

[57] ABSTRACT

A mold for molding plastic products includes a fixing plate and a moving plate which is movable toward and away from the fixing plate. The fixing plate and the moving plate include respective cavity-forming portions which form a cavity into which a melted plastic is injected so as to form a molded product. A plurality of molding pins is provided having prominence-depression portions positionable in the cavity for forming undercut portions in the molded product, the molding pins being slidable through the moving plate by an eject plate. The molding pins pass obliquely through the moving plate so that as they slide therethrough, their prominence-depression portions are separated from the undercut portions of the product. Two of the molding pins form on the product a partition wall having undercut portions at opposite sides thereof. Those two molding pins cross over one another so that the prominence-depression portions thereof face each other, with no part of the cavity-forming portions situated therebetween.

2 Claims, 7 Drawing Sheets

MOLD FOR INJECTION MOLDING OF A PLASTIC PRODUCT

BACKGROUND OF THE INVENTION

1. Field of the Invention

The present invention relates to a mold for molding a plastic, more particularly to a mold for injection molding of a plastic by means of which undercut portions can be formed at both sides of a partition wall of an injection-molding product.

2. Description of the Prior Art

Injection molding is one method for molding a plastic wherein a melted plastic is injected into a cavity of a mold having a predetermined shape, and then is cooled so as to be solidified thereby forming a product having a shape identical to a shape of the cavity.

Generally, such mold comprises a fixing plate and a moving plate which is detachably coupled to the fixing plate. When the moving plate is coupled to the fixing plate, the cavity is formed therebetween. If an injection-molding product has an undercut portion which interrupts the moving plate from moving in the forward or backward direction with respect to the fixing plate thereby preventing the injection-molding product from being ejected from the cavity, an auxiliary member such as a molding pin or a stripper is required for ejecting the injection-molding product from the cavity.

FIG. 1a shows a conventional mold for molding a plastic which is used for making a ledge which is installed at a freezing chamber of a refrigerator and on which an ice vessel is mounted.

As shown in the figure, the mold comprises a fixing plate 10, a moving plate 20, an eject plate 30 and a plurality of molding pins 40.

Moving plate 20 can move in the forward or backward direction with respect to fixing plate 10 such that moving plate 20 can be coupled to or separated from fixing plate 10. Moving plate 20 includes a front plate 24 and a rear plate 26 which is spaced by a predetermined distance apart from front plate 24 by means of connecting rod 28.

Fixing plate 10 has a fixing core 12 and moving plate 20 has a moving core 22 which faces to fixing core 12. Fixing core 12 is incorporated with moving core 22 so as to form a cavity in which a product 50 is molded.

Eject plate 30 is provided between front plate 24 and rear plate 26 of moving plate 20 such that eject plate 30 can be moved in the forward and backward directions along connecting rod 28 which connects front plate 24 and rear plate 26 to each other.

In addition, the plurality of molding pins 40 have prominence-depression portions 42 for forming undercut portions to product 50. Molding pins 40 obliquely pass through moving core 22 and end portions thereof are coupled to eject plate 30 in such a manner that molding pins 40 slidably move along eject plate 30 within a predetermined range.

In the above construction as shown in FIG. 1a, in a state when the mold is closed, a melted plastic is injected into the cavity formed between fixing and moving cores 12 and 22 through a gate (not shown), so ledge 50 for mounting the ice vessel is formed in correspondence to the shape of the cavity.

When the molding of ledge 50 has been finished, as shown in FIG. 1b, moving plate 20 including moving core 22, eject plate 30 and molding pins 40 are withdrawn from fixing plate 10 together with molded ledge 50 for mounting the ice vessel, so the mold is opened.

After that, eject plate 30 is again moved toward fixing plate 10 so that molding pins 40 coupled to eject plate 30 are moved toward fixing plate 10 thereby separating the product, that is ledge 50, from moving core 22.

At this time, since molding pins 40 obliquely pass through moving plate 20 having moving core 22, molding pins 40 are slid in the lateral direction while they are moving in the forward direction. Accordingly, prominence-depression portions 42 of molding pins 40 are separated from the undercut portions of ledge 50 so that the ejection of ledge 50 is possible. FIG. 1c shows ledge 50 separated from prominence-depression portions 42 of molding pins 40.

However, the conventional mold used in the injection molding of the plastic cannot make undercut portions at both sides of a partition wall of the injection-molding product. In other words, there is required a predetermined distance between the prominence-depression portions of the molding pins in order to prevent two molding pins moving in the opposite directions to each other along the eject plate from interfering with each other. That is, the conventional mold does not make the undercut portions to both sides of one guide rail so as to allow two ice vessels to share a guide rail 52 of ledge 50 as shown in FIG. 1a. Accordingly, there is required two partition walls having a predetermined distance therebetween in order to provide a partition section having the undercut portions at both sides thereof. As a result, materials are unnecessarily wasted, so that not only is manufacturing cost increased, but also the design of the product is limited.

SUMMARY OF THE INVENTION

The present invention has been made to overcome the above described problem of the prior art, and accordingly it is an object of the present invention to provide a mold for injection molding of a plastic by means of which undercut portions can be formed at both sides of a partition wall of an injection-molding product.

To achieve the object, the present invention provides a mold for injection molding of a plastic, the mold comprising a fixing plate forming a part of a cavity into which a melted plastic is injected so as to be molded, a moving plate which is movably disposed on the fixing plate so as to separate from the fixing plate and is incorporated with the fixing plate so as to form the cavity, a plurality of molding pins having prominence-depression portions for forming undercut portion to a product which is molded in the cavity, the molding pins obliquely passing through the moving plate, and an eject plate which moves against the moving plate so as to move the molding pins and so as to slidably move the molding pins in a direction such that the molding pins are separated from the undercut portions of the product, end portions of the molding pins being slidably coupled to the eject plate, wherein two of the molding pins for forming a partition wall having the undercut portions at both sides thereof are crossed to each other about the eject plate so that the prominence-depression portions thereof make contact with each other.

Preferably, the two of molding pins are crossed to each other as if hands are clasped.

According to the present invention having the above construction, since two molding pins positioned at the center of the mold are crossed to each other about eject plate, prominence-depression portions, which are position in the cavity in order to make the undercut portions, can make contact with each other. Accordingly, a partition wall can be provided in ledge and it is possible to form the undercut portions at both sides of the partition wall.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE PREFERRED EMBODIMENT

Figure 1A:
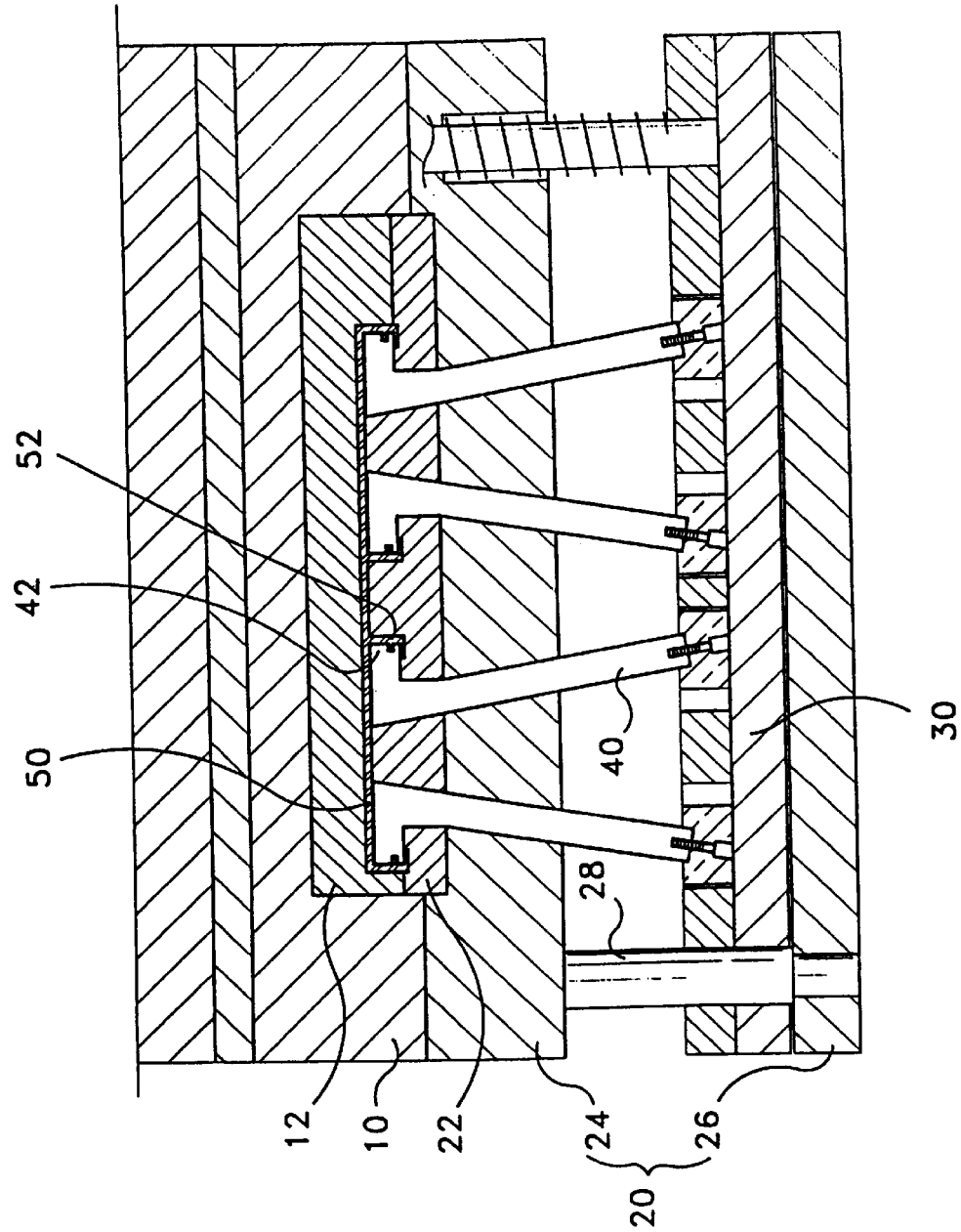
FIG. 1a is a sectional view showing a conventional mold used for injection molding of a plastic.
Figure 1B:
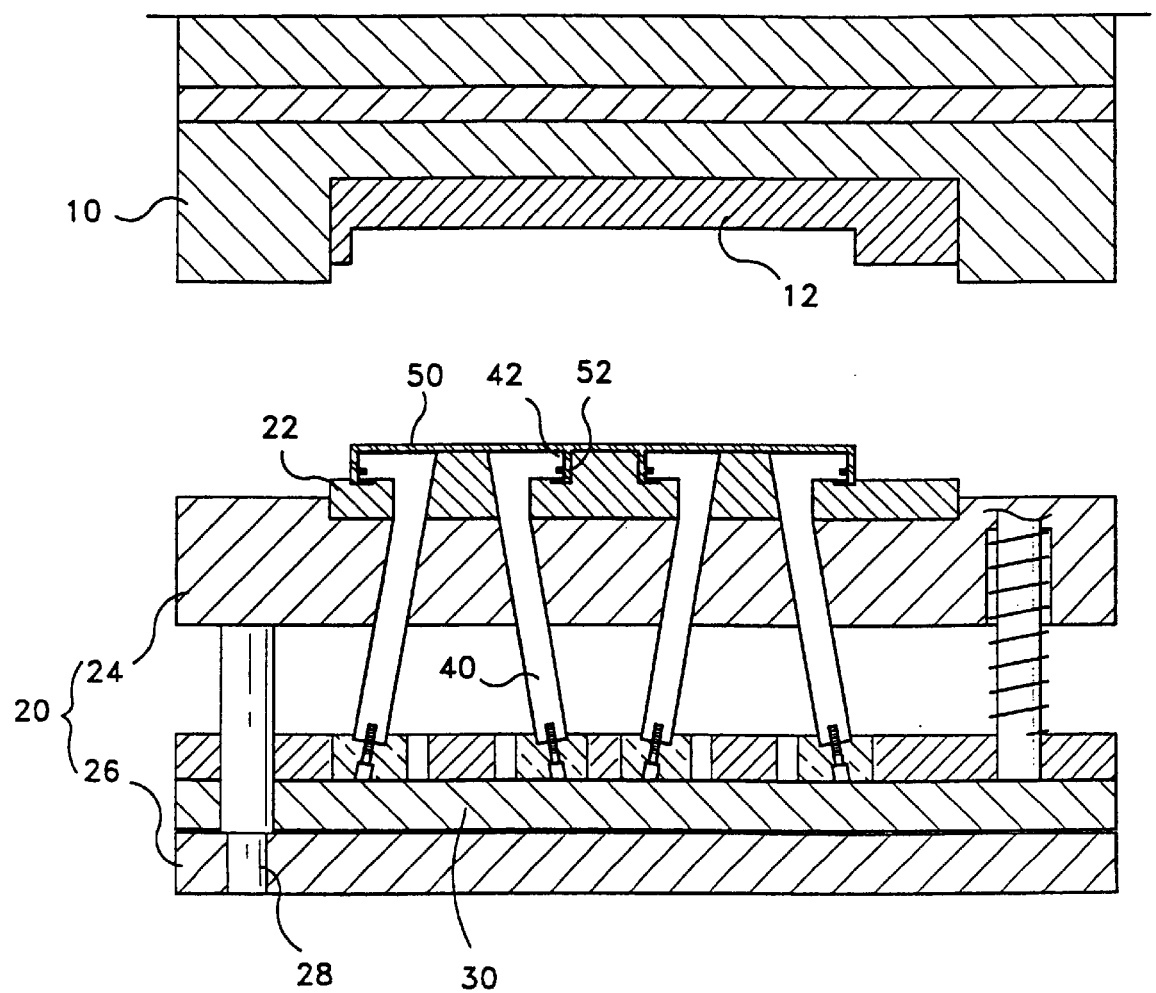
FIG. 1b is a sectional view of the mold shown in FIG. 1a when the mold is opened.
Figure 1C:
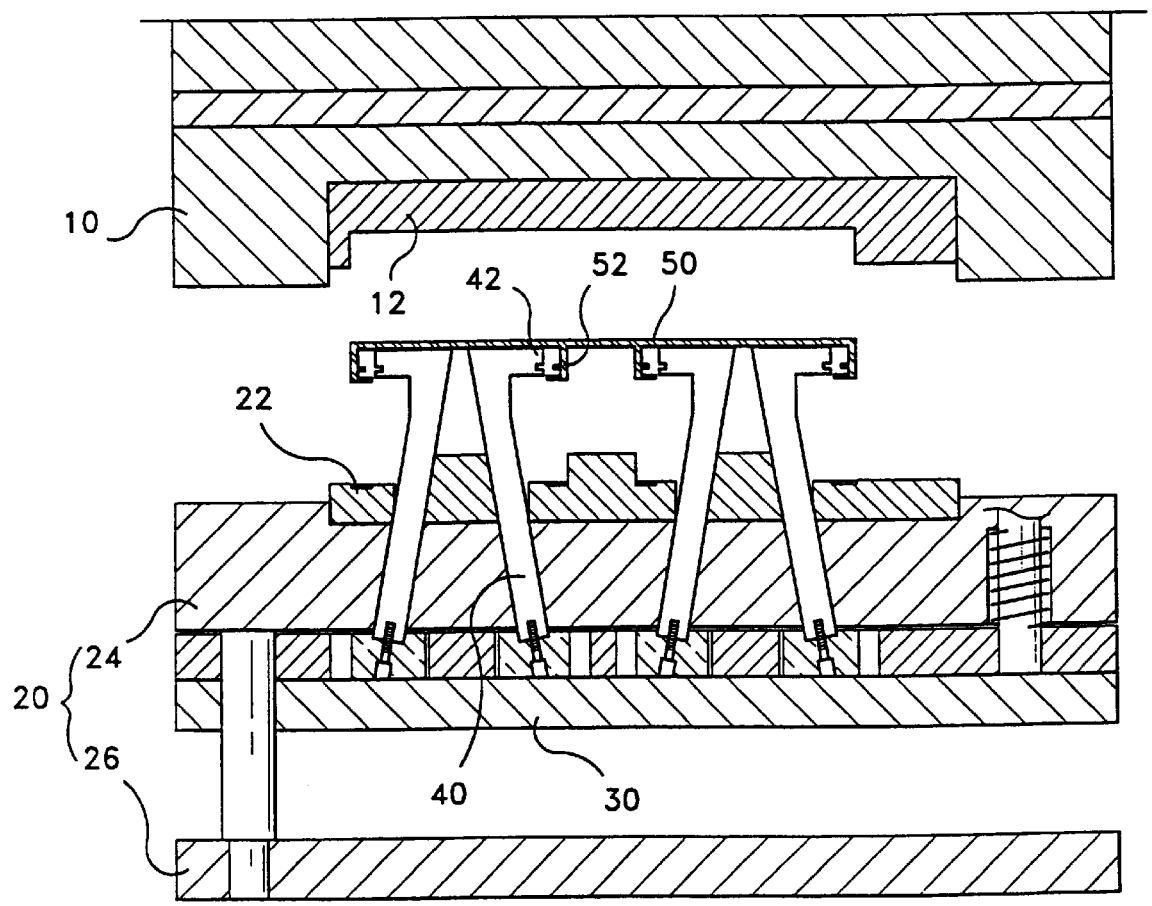
FIG. 1c is a sectional view in which molding pins of the mold shown in FIG. 1a are separated from the undercut portions of a product.
Figure 2A:
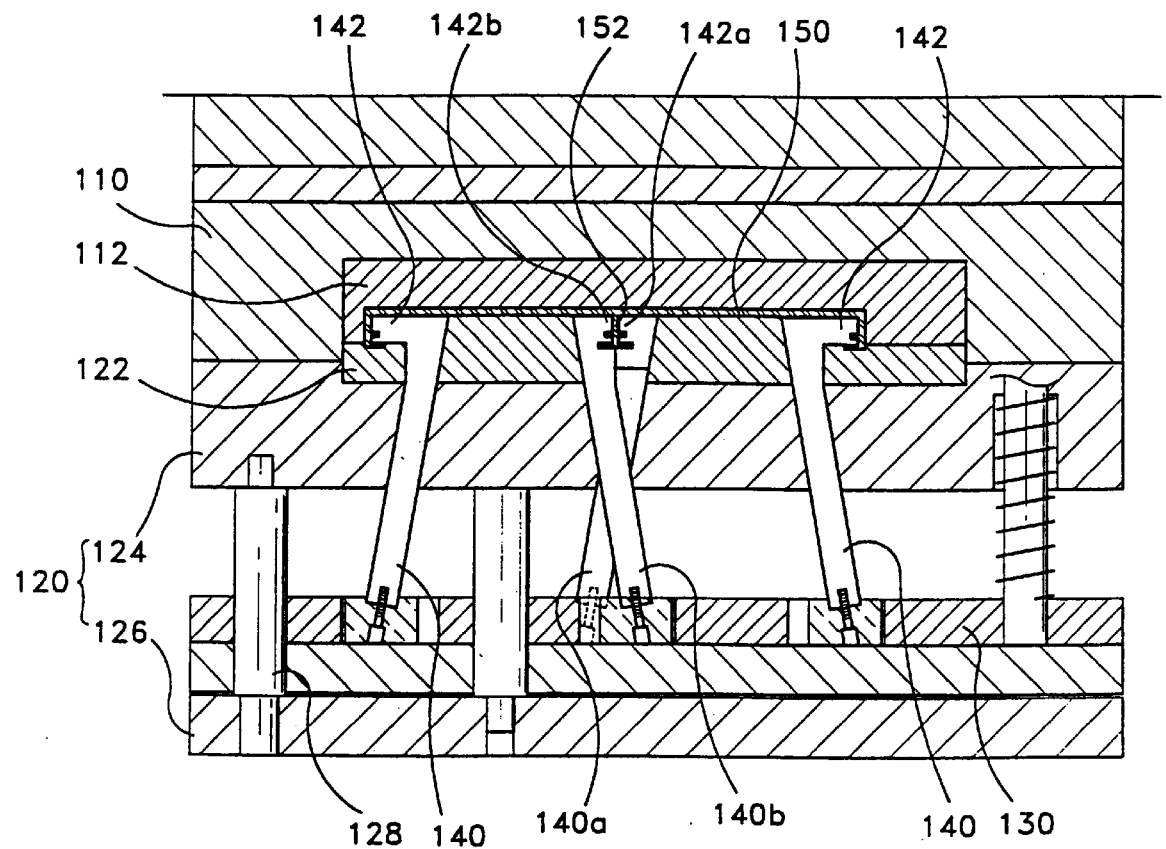
FIG. 2a is a sectional view showing a mold used for injection molding of a plastic according to the present invention.
Figure 2B:
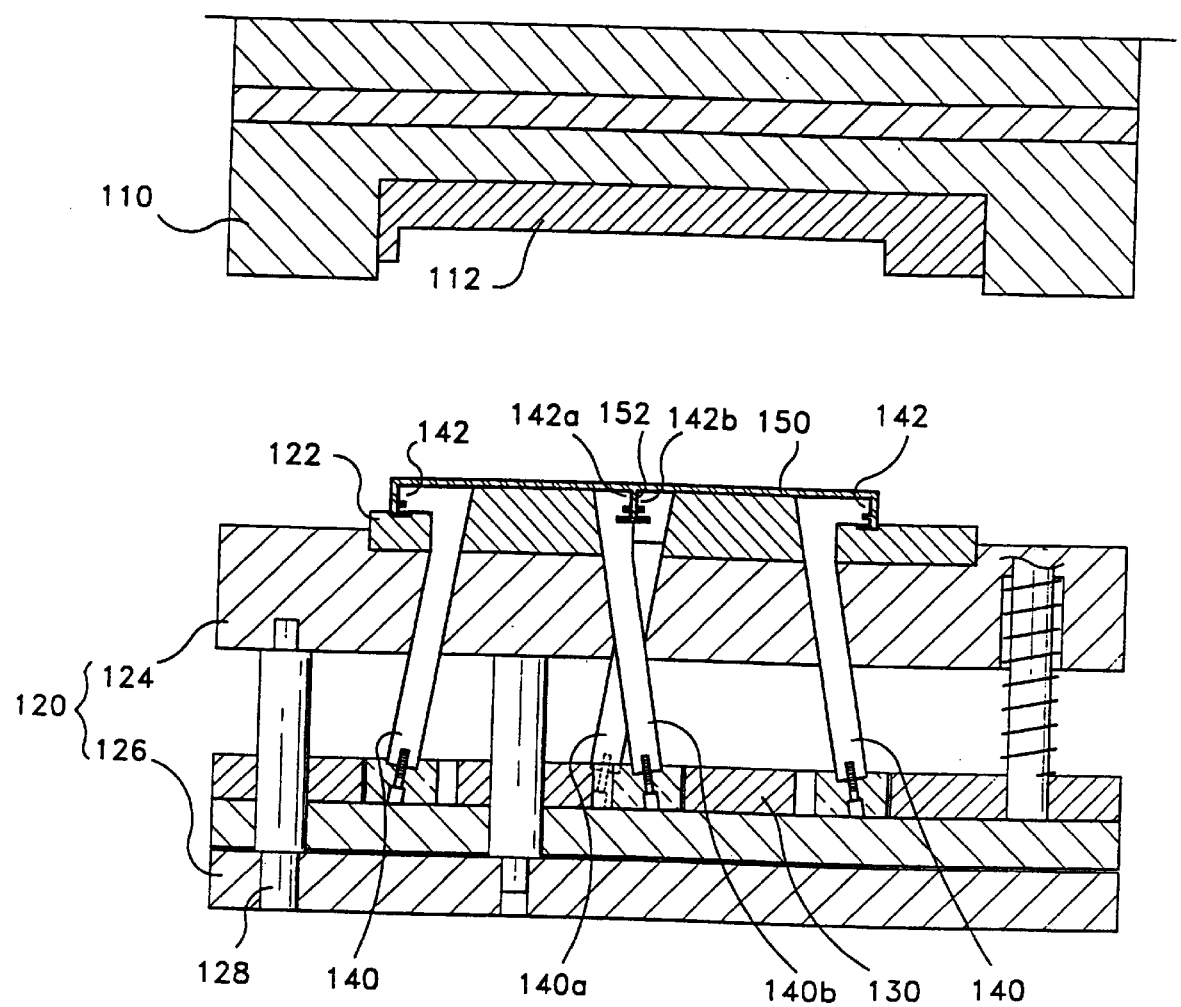
FIG. 2b is a sectional view showing the mold according to the present invention when the mold is opened.
Figure 2C:
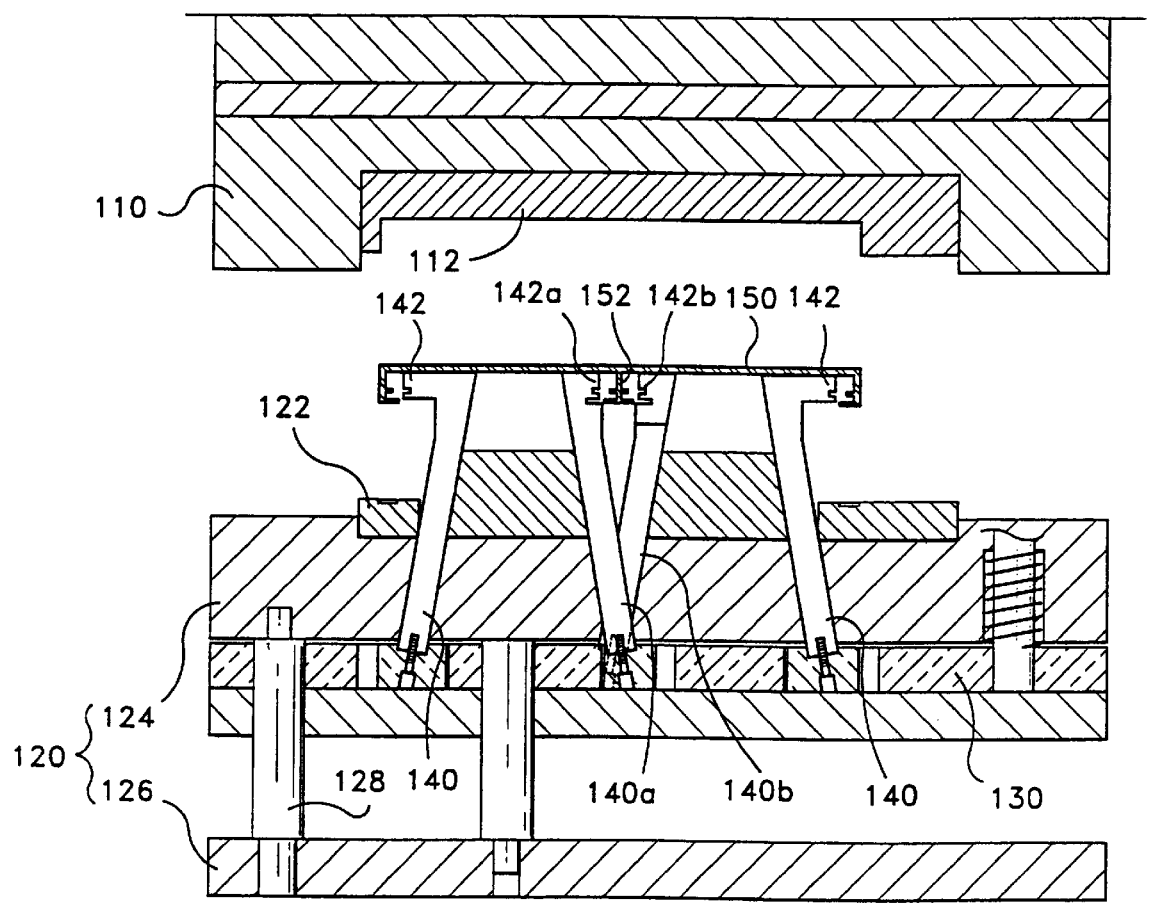
FIG. 2c is a sectional view in which molding pins of the mold according to the present invention are separated from the undercut portions of a product.

FIGS. 2a to 2c show a mold used for injection molding of a plastic according to the present invention.

As shown in the figures, the mold of the present invention comprises a fixing plate 110, a moving plate 120 which is incorporated with fixing plate 110 so as to form a cavity therebetween, a plurality of molding pins 140, 140a and 140b for making undercut portions, and an eject plate 130 for separating molding pins 140 from a product or a ledge 150.

Fixing plate 110 has a fixing core 112 and moving plate 120 has a moving core 122 which faces to fixing core 112. Fixing core 112 is incorporated with moving core 122 so as to form the cavity in which product 150 is molded. In addition, moving plate 120 can move in the forward or backward direction with respect to fixing plate 110 such that moving plate 120 can be coupled to or separated from fixing plate 110. Moving plate 120 includes a front plate 124 and a rear plate 126 which is spaced by a predetermined distance apart from front plate 124 by means of connecting rod 128.

Eject plate 130 is provided between front plate 124 and rear plate 126 of moving plate 120 such that eject plate 130 can be moved in the forward and backward directions along connecting rod 128 which connects front plate 124 and rear plate 126 to each other.

In addition, the plurality of molding pins 140, 140a and 140b have prominence-depression portions 142, 142a and 142b for forming undercut portions to product 150 respectively. Molding pins 140 obliquely pass through moving core 122 and end portions thereof are coupled to eject plate 130 in such a manner that molding pins 140, 140a, and 140b slidably move along eject plate 130 within a predetermined range.

In this state, two molding pins 140a and 140b positioned at a center of the mold which are forming a guide rail 152 positioned at a center of ledge 150 are crossed to each other about eject plate 130.

Figure 3:
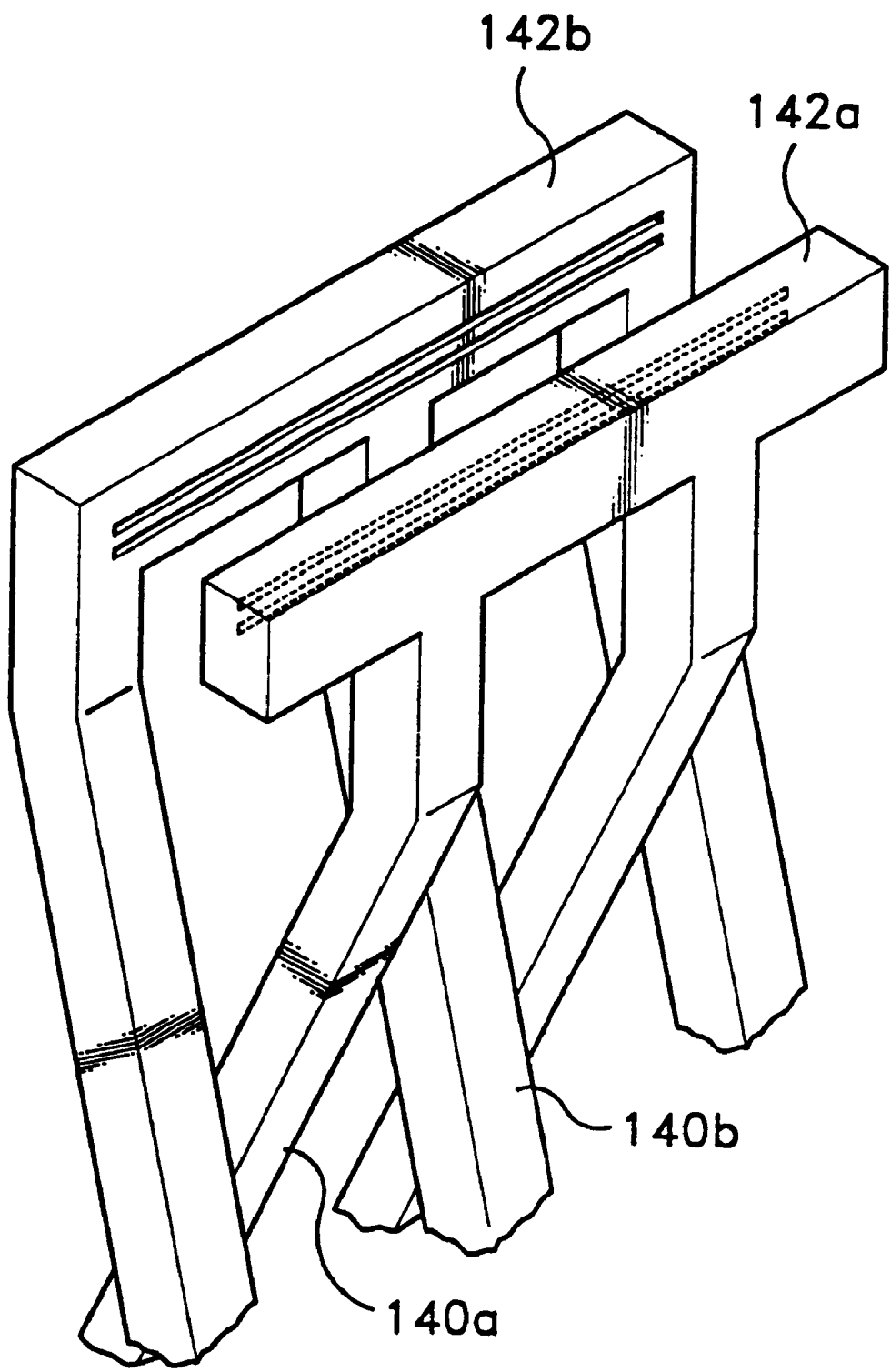
FIG. 3 is a perspective view showing molding pins of the mold to be crossed with each other according to the present invention.

That is, as shown in FIG. 3 in detail, molding pins 140a and 140b positioned at the center of the mold are crossed to each other as if one's hands are clasped such that prominence-depression portions 142a and 142b make contact with each other.

As shown in FIG. 2a, melted plastic is injected into the cavity formed between fixing and moving cores 112 and 122 through a gate (not shown) and then is cooled so as to be solidified, so ledge 150 for mounting the ice vessel is formed in correspondence to the shape of the cavity. When the molding of ledge 150 has been finished, as shown in FIG. 2b, moving plate 120 and eject plate 130 are withdrawn from fixing plate 110 together with molded ledge 150, so the mold is opened.

After that, eject plate 130 is moved against moving plate 120 thereby pushing molding pins 140, 140a and 140b and ledge 150 toward the front of the moving core 122. In this process, molding pins 140, 140a, 140b are slid in the lateral direction thereof, so they are separated from undercut portions of ledge 150. Accordingly, the ejection of ledge 150 from the mold is possible.

According to the present invention having the above construction, since two molding pins 140a and 140b positioned at the center of the mold are crossed to each other about eject plate 130, prominence-depression portions 142a and 142b, which are position in the cavity in order to make the undercut portions, can make contact with each other. Accordingly, a partition wall such as guide rail 152 can be provided in ledge 150 and it is possible to form the undercut portions at both sides of the partition wall.

As a result, as compared with the conventional mold, the mold of the present invention can reduce the waste of materials, so that not only is manufacturing cost decreased, but also the product can be variously designed.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A mold for injection molding of plastic products, the mold comprising:

a fixing plate including a first cavity-forming portion forming a part of a cavity into which a melted plastic is injected so as to be molded;

a moving plate movably disposed on the fixing plate so as to be movable toward and away from the fixing plate and including a second cavity-forming portion cooperating with the first cavity-forming portion so as to form the cavity therewith;

a plurality of molding pins having prominence-depression portions positionable in the cavity for forming undercut portions in a product molded in the cavity, the molding pins slidably passing through the second cavity-forming portion obliquely thereto; and an eject plate movable relative to the fixing plate and the moving plate and connected to the molding pin so as to slidably move the obliquely arranged molding pins relative to the second cavity-forming portion such that the prominence-depression portions are separated from the respective undercut portions of the molded product;

wherein two of the molding pins cross over one another and have their respective prominence-depression portions facing one another with no part of the cavity-facing portions being situated therebetween, to form on the molded product a partition wall having undercut portions on opposite sides thereof.

2. The mold as claimed in claim 1, wherein the two molding pins cross over one another in the manner of clasped hands.

* * * * *